United States Patent [19]

Yamamoto et al.

[11] Patent Number: 5,064,984
[45] Date of Patent: Nov. 12, 1991

[54] POWER SUPPLY UNIT ELECTRIC DISCHARGE MACHINING APPARATUS

[75] Inventors: Masahiro Yamamoto; Takuji Magara, both of Aichi, Japan

[73] Assignee: Mitsubishi Denki K.K., Tokyo, Japan

[21] Appl. No.: 582,066

[22] Filed: Sep. 14, 1990

[30] Foreign Application Priority Data

Sep. 18, 1989 [JP] Japan .................................. 1-241102

[51] Int. Cl.⁵ ............................................. B23H 1/02
[52] U.S. Cl. ................................ 219/69.13; 219/69.18
[58] Field of Search ................ 219/69.13, 69.18, 69.19

[56] References Cited

U.S. PATENT DOCUMENTS

| | | | |
|---|---|---|---|
| 3,558,998 | 1/1971 | Bertolasi | 219/69.13 |
| 4,017,705 | 4/1977 | Bazhenov et al. | 219/69.13 |
| 4,211,908 | 7/1980 | Niwa | 219/69.18 |
| 4,347,425 | 8/1982 | Obara | 219/69.13 |
| 4,447,713 | 5/1984 | Tsurumoto et al. | 219/69.18 |
| 4,678,884 | 7/1987 | Obara et al. | 219/69.18 |
| 4,678,885 | 7/1987 | Dresti et al. | 219/69.13 |
| 4,720,616 | 1/1988 | Inoue | 219/69.18 |

FOREIGN PATENT DOCUMENTS

| | | |
|---|---|---|
| 60-255314 | 12/1985 | Japan . |
| 61-8222 | 1/1986 | Japan . |
| 192415 | 8/1986 | Japan ................................ 219/69.12 |

Primary Examiner—Geoffrey S. Evans
Attorney, Agent, or Firm—Sughrue, Mion, Zinn, Macpeak & Seas

[57] ABSTRACT

A power supply unit in an electric discharge machining apparatus which is capable of supplying an AC pulse signal whose polarity is varied alternately. Due to the application of AC pulse signal to an interelectrode gap, it is possible to prevent the surface of a workpiece to be machined from being electrolytically corroded, electrolyzed and magnetized.

5 Claims, 4 Drawing Sheets

POWER SUPPLY UNIT ELECTRIC DISCHARGE MACHINING APPARATUS

BACKGROUND OF THE INVENTION

This invention relates to power supply units, and more particularly to a power supply unit for use in an electric discharge machining apparatus.

FIG. 1 is a circuit diagram showing an example of a conventional power supply unit for an electric discharge machining apparatus. Referring to the figure, reference numeral 1 designates a first DC power supply circuit which produces a first variable DC voltage signal; 2, an interelectrode gap formed between a workpiece to be machined and an electrode; 3, a first switching element for switching the DC voltage signal supplied from the first DC power supply circuit 1 to the gap 2; 4, a first drive circuit for driving the first switching element 3; 5, a current limiting resistor for limiting a current flowing from the first 1 to the gap 2. The first DC power supply circuit 1, the first switching element 3, the first drive circuit 4, and the current limiting resistor 5 constitute an auxiliary switching circuit. Reference numeral 6 designates a second DC power supply circuit which produces a second variable DC voltage signal higher than the first variable DC voltage signal; 7, a second switching element for switching the second DC voltage signal; 8, a second drive circuit for driving the second switching element 7. The second DC power supply circuit 6, the second switching element 7, and the second drive circuit 8 constitute a main switching circuit. Reference numeral 9 designates a detector for detecting a voltage appearing across the interelectrode gap 2 to thereby detect the state of the gap. In response to the detection result, the detector 9 operates to control the first drive circuit 4 and the second drive circuit 8 on the basis of an internally programmed set of sequences; and 10 and 11, diodes for preventing the reverse flow of current.

An operation of this power supply unit will be described. When the first drive circuit 4 constituting the auxiliary switching circuit causes the first switching element 3 to be turned on, the first DC voltage signal is applied to the interelectrode gap 2 through the current limiting resistor 5 and the diode 10.

As described above, the detector 9 detects the gap voltage appearing across the interelectrode gap 2 so that the detection result is applied to the first drive circuit 4 and the second drive circuit 8 as a control signal. More specifically, the detector 9 is able to detect three types of gap states so as to supply as a control signal to the first and second drive circuit 4 and 8 an internally programmed sequence signal selected according to the detected type of states. These three types of gap states will be described in detail. When the gap 2 is in an open state as a first state, the first switching element 3 is turned on, as shown in FIG. 2(a), to allow the output of the first DC power supply 1 to be applied to the gap 2. Since the gap 2 is maintained open, the voltage detected by the detector 9 is equal to the output voltage of the first DC power supply circuit 1 as supplied as shown FIG. 2(c). Thus, upon detection of the first state, the detector 9 controls the first drive circuit 4 according to a preprogrammed sequence to thereby cause the first switching element 3 to maintain its on-state.

Then, upon an occurrence of discharge at the gap 2, a discharge current shown in FIG. 2(d), which is limited by the current limiting resistor 5 flows resulting in drop of the voltage at the gap 2 as shown in FIG. 2(c). Upon detection of the voltage drop at the gap 2, the detector 9 judges that the second state is present, as a result of which a predetermined sequence control is then executed. More specifically, the auxiliary switching circuit is provided with the current limiting resistor 5, and therefore a sufficient amount of discharge current is not allowed to flow therethrough. Consequently, the detector 9, upon detection of the second state, starts controlling the second drive circuit 8 based on the above-described sequence control to thereby turn on the second switching element 7 as shown in FIG. 2(b) so that the output of the second DC power supply circuit 6 is applied to the gap 2. Then, a large current flows through the gap 2 as shown in FIG. 2(d) for the reasons that the output voltage of the second DC power supply circuit 6 is higher than that of the first DC power supply circuit 1 and that there is no current limiting resistor on the output side of the second DC power supply circuit 6. As a result, it becomes possible to carry out the electric discharge machining operation with a maximum current to be effected. Upon detection of the second state, the detector 9 also controls the first drive circuit 4 so that the first switching element 3 will be turned off with a delay of a predetermined time as shown in FIG. 2(b). The period in which the second switching element 7 maintains its on-state corresponds to a discharge period specified by a predetermined sequence control.

The conventional power supply unit for electric discharge machining apparatus thus constructed allows only a potential of a predetermined polarity to be applied between the workpiece and the electrode. This induces not only electrolytic corrosion and electrolysis which promotes to wear the surface to be processed but also the electromagnetic effect derived from the application of potentials of a single polarity which then encourages to magnetize it, thus causing the problem of requiring time-consuming post-treatments after the processing, and the like.

SUMMARY OF THE INVENTION

In view of the above-described disadvantages or difficulties accompanying the convention unit, an object of the present invention is to provide a power supply unit for use in an electric discharge machining apparatus, which is capable of preventing a workpiece from being subjected to electrolytic corrosion, electrolysis or magnetization during discharge machining.

According to the present invention, the above, and other object of the present invent is accomplished by the provision of a power supply unit for electric discharge machining apparatus comprising an AC pulse producing means as a machining power source for applying an AC pulse voltage signal between a workpiece and an electrode, the machining power source being of a dual AC power source.

Since the power supply unit for electric discharge machining applies an AC pulse power supply between the workpiece and the electrode as the processing power supply, the polarity of the processing power supply changes alternately. As a result, the surface to be processed is not subjected to the application of a unipolar potential, thereby preventing the workpiece from being electrolytically corroded, electrolyzed and magnetized.

DESCRIPTION OF THE PREFERRED EMBODIMENT

Figure 1:
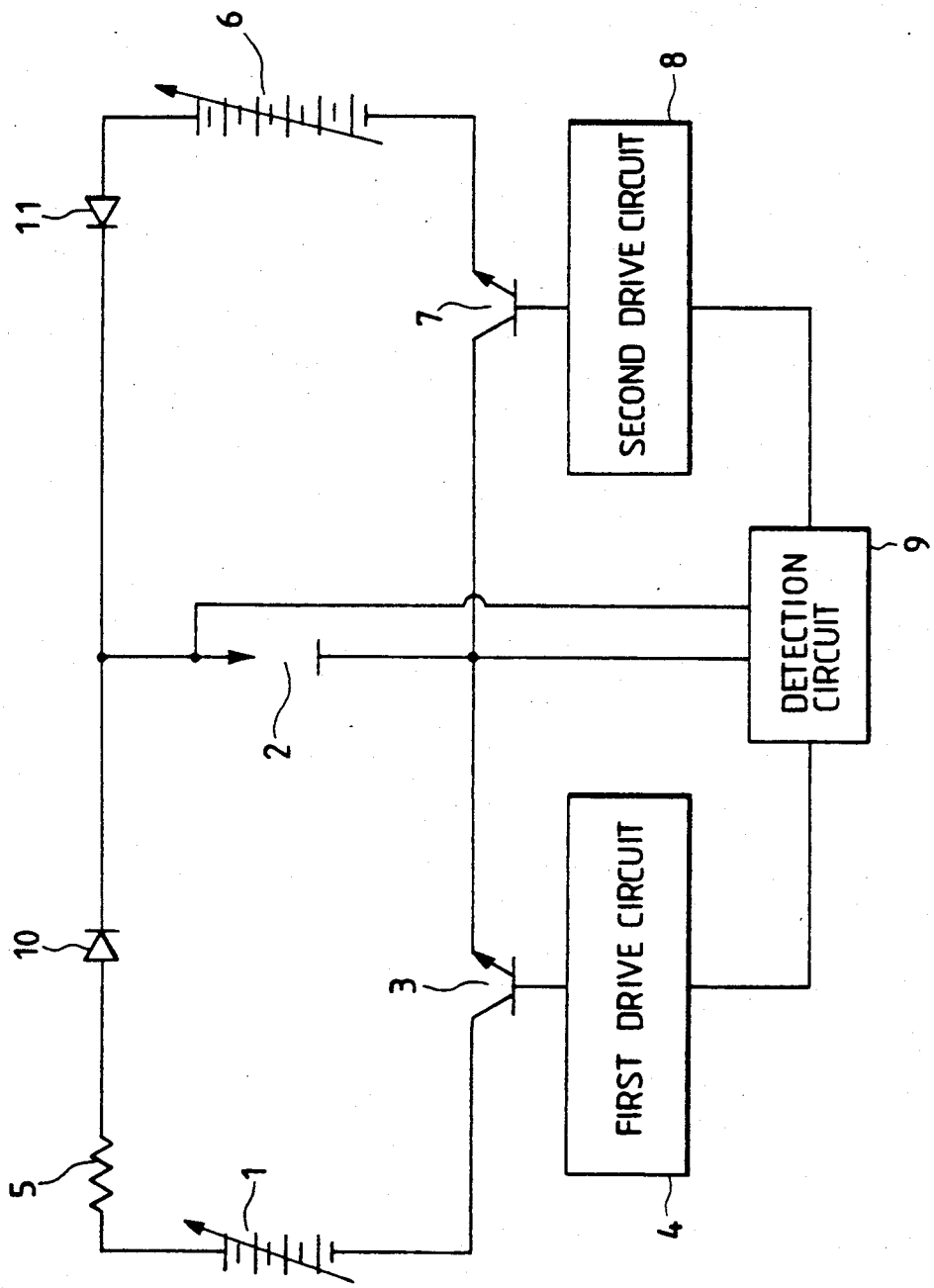
FIG. 1 is a circuit diagram showing a conventional power supply unit for an electric discharge machining.
Figure 2:
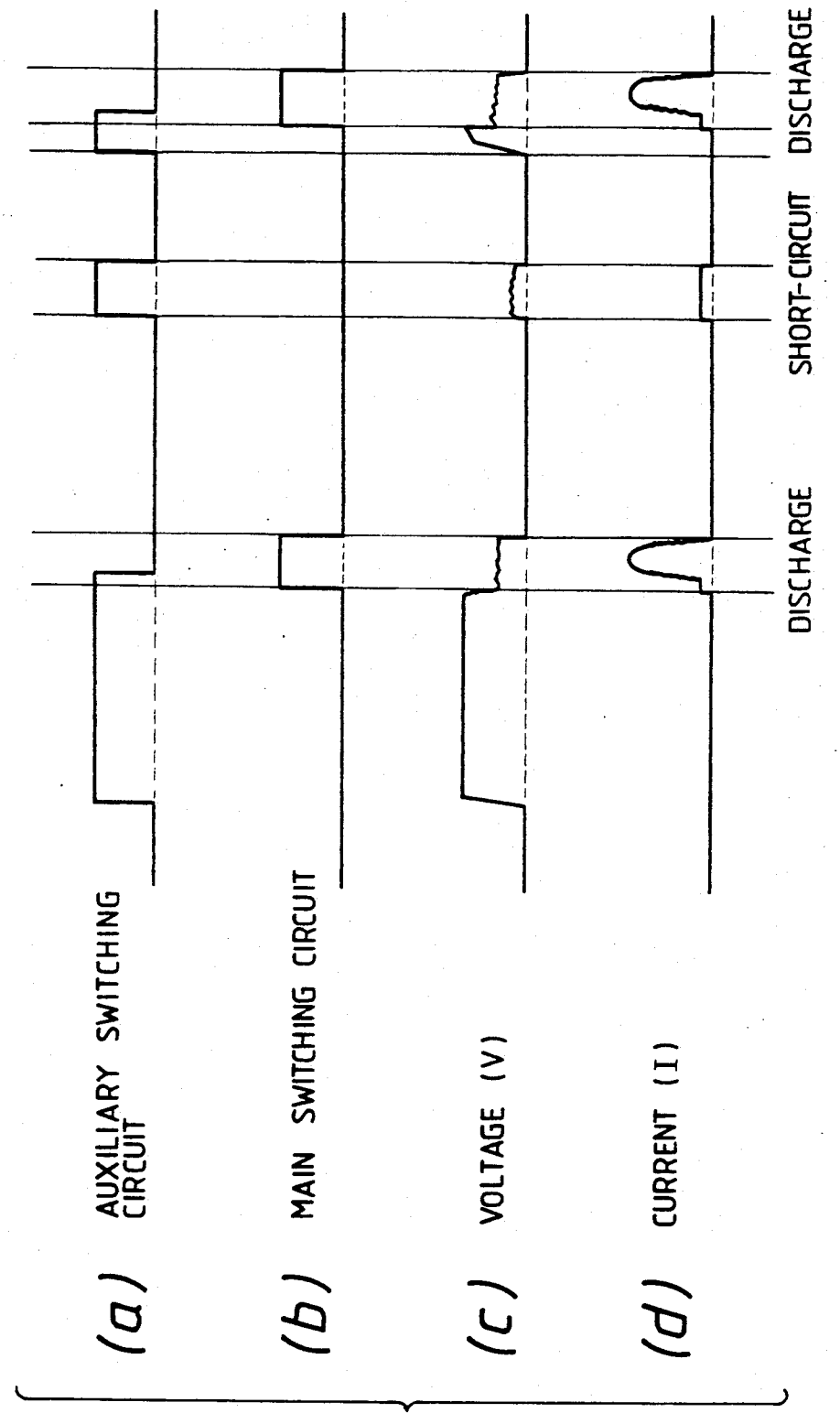
FIG. 2 is a timing chart showing waveforms when various parts of the circuit shown in FIG. 1 are operated.
Figure 3:
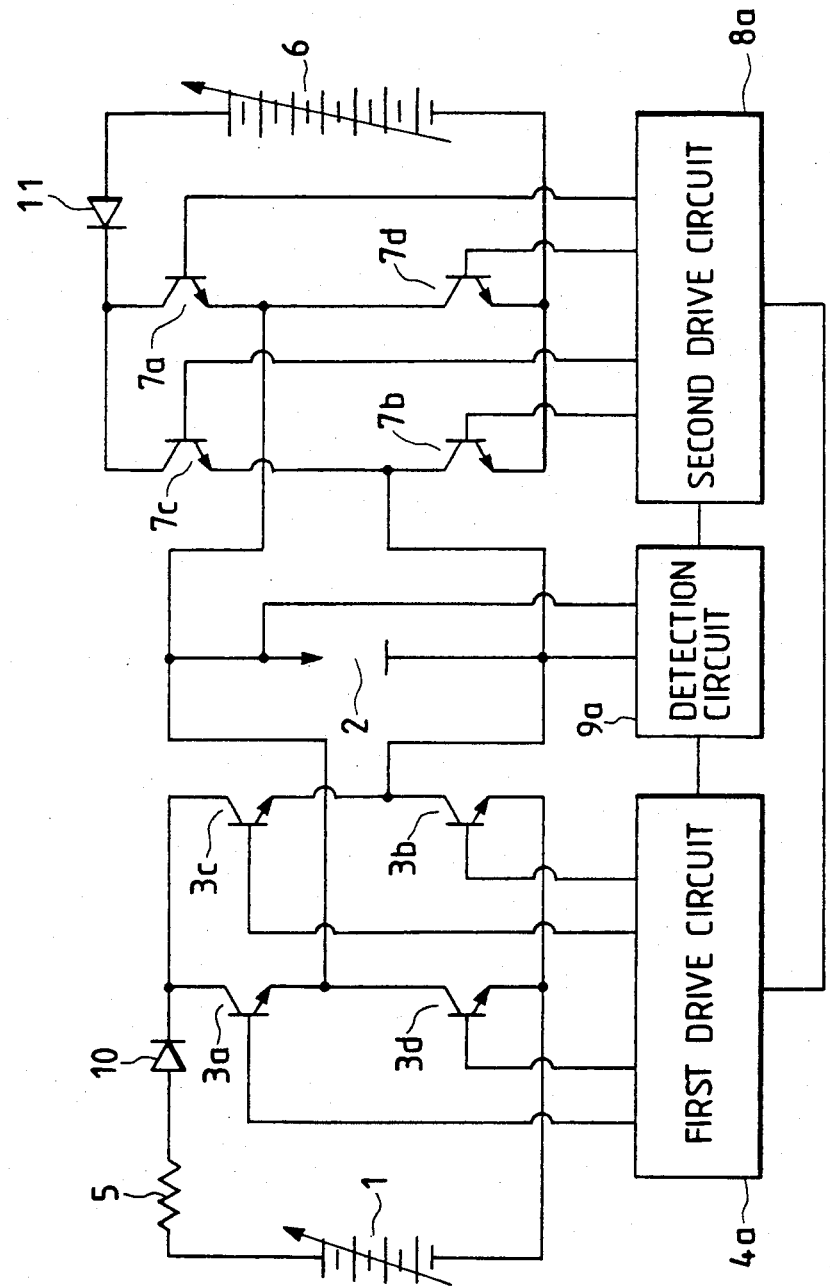
FIG. 3 is a circuit diagram showing an embodiment of a power supply unit for an electric discharge machining.

An embodiment of the present invention will hereunder be described with reference to the accompanying drawings. FIG. 3 is a circuit diagram showing an embodiment of a power supply unit for use in an electric discharge machining apparatus according to this invention. Referring to the figure, reference numeral 1 designates a first DC power supply circuit which produces a first variable DC voltage signal; 2, an interelectrode gap formed between a workpiece and an electrode; 3a to 3d, switching elements which operates to subject the first DC voltage signal of the first DC power supply circuit 1 to switching control to apply the AC pulse voltage between the gap 2; 4a, a first drive circuit for driving the switching elements 3a to 3d; 5, a current limiting resistor for limiting the current flowing from the first DC power supply circuit 1. The first DC power supply circuit 1, the switching elements 3a to 3d, the first drive circuit 4, and the current limiting resistor 5 constitute an auxiliary switching circuit. Reference numeral 6 designates a second DC power supply circuit which can supply a second variable DC voltage signal higher than the first DC voltage signal; 7a to 7d, switching elements which operates to subject the second DC voltage signal of the second DC power supply circuit 6 to switching control to apply the AC pulse voltage between the gap 2; 8a, a second drive circuit for driving the switching elements 7a to 7d. The second DC power supply circuit 6, the switching elements 7a to 7d, and the second drive circuit 8a constitute a main switching circuit. Reference numeral 9a designates a detection circuit which detects a voltage appearing across the interelectrode gap 2 in both polarities to thereby detect gap states. According to the detection result, the detection circuit 9a operates to control both the first drive circuit 4a and the second drive circuit 8a based on an internally programmed set of sequences; and 10 and 11, diodes for checking and preventing the reverse flow of current.

An operation of this power supply unit will be described. A DC output signal of the first DC power supply circuit 1 is first converted into an AC pulse signal by causing the first drive circuit 4 to drive the switching elements 3a to 3d in the following manner and the thus converted AC pulse signal is then applied to the gap 2. That is, the switching elements 3a and 3b are simultaneously turned on to allow the output of the first DC power supply circuit 1 to be applied to the gap 2. The voltage at the gap 2 at this time is positive as the first half of the open state shows in FIG. 4(a). Then, upon turning off of the switching elements 3a and 3b, the switching elements 3c and 3d are, in turn, turned on. As a result, a voltage whose polarity is opposite to the preceding voltage is applied to the gap 2. The voltage in this case is thus negative as the latter half of the open state shows in FIG. 4(a).

Accordingly, by causing a pair of switching elements 3a, 3b and a pair of switching elements 3c, 3d of the auxiliary switching circuit to be driven alternately by the first DC power supply circuit 1, the ac pulse voltage as shown by the open state in FIG. 4(a) is applied to the interelectrode gap 2. The AC pulse voltage thus applied to the gap 2 is detected by the detector 9, which then judges whether or not a discharge is generated. This detector 9 generates a discharge detection inhibit signal A for inhibiting the detection of discharge in order to prevent erroneous operation in the phase during which the detected voltage is inverted as shown in FIG. 4(c).

When the detector 9 detects the occurrence of discharge at the gap 2, it supplies a drive signal C shown in FIG. 4(e) to the second drive circuit 8a, which in turn receives from the first drive circuit 4a a polarity judgement signal B for indicating the direction in which the discharge is generated as shown in FIG. 4(d). From these two types of signal, the second drive circuit 8a selectively drives the switching elements 7a to 7d so that the DC voltage of the same polarity as that supplied by the first drive circuit 4a is applied. Therefore, as shown in FIG. 4(g), a positive voltage is applied while the first drive circuit 4a applies a positive voltage to the gap 2, whereas a negative voltage is applied while the first drive circuit 4a applies a negative voltage to the gap 2. Simultaneously with the start of the second drive circuit 8a, the first drive circuit 4a is stopped.

Figure 4:
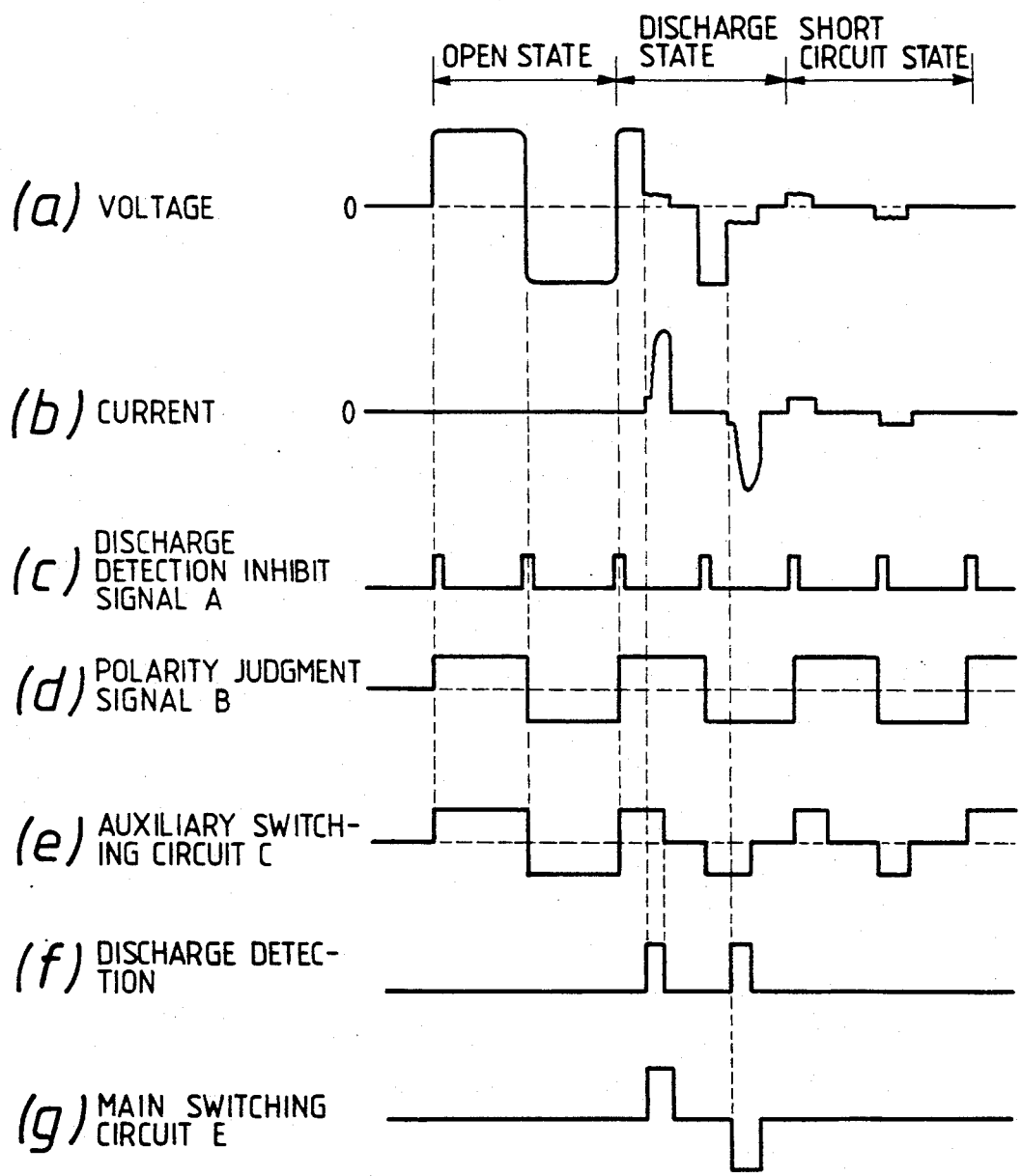
FIG. 4 is a timing chart showing waveforms when various parts of the circuit shown in FIG. 3 are operated.

Since the driving of the second drive circuit 8a causes the second DC power supply circuit 6 to be connected to the gap 2, a large current is allowed to flow. Thus, such a discharge state as shown in FIG. 4 can be obtained by allowing a large current not obtainable by the first DC power supply circuit 1 to flow through the gap 2. It is arranged so that the first drive circuit 4a is driven after the supply of current has been completed by the second drive circuit 8a.

Since no current that is more than necessary is allowed to flow in a short-circuit state shown in FIG. 4, a small current shown in FIG. 4(b) is caused to flow through the gap by applying both positive and negative dc voltages only for a short period as shown in FIG. 4(a).

The power supply unit for an electric discharge machining apparatus constructed as described above constantly produces a voltage of either positive or negative pulse which is to be applied to the gap. This means that the voltage to be applied is, as a whole, an AC pulse, thereby not only serving to prevent the workpiece from being damaged due to electrolytic corrosion and electrolysis but also preventing the workpiece from being magnetized due to the electromagnetic effect.

Although, in the above embodiment, the case where the electric discharge machining operation is effected with the AC pulse voltage generated by operating the pair of switching elements 3a and 3b and the pair of switching elements 3c and 3d alternately, it goes without saying that the electric discharge machining according to the same operation as that of the conventional power supply unit, i.e., a unipolar DC pulse power supply, can be performed by driving only one of these pairs.

As described above, the power supply unit for electric discharge machining apparatus according to this invention allows electric discharge machining to be performed while applying an ac pulse to the gap but also a larger current to flow when the electric discharge starts taking place in the gap. Therefore, it provides advantages of preventing electrolytic corrosion or electrolysis without reducing the electric discharge machining speed, and also of preventing the magnetization of the workpiece.

What is claimed is:

1. A power supply unit for electric discharge machining apparatus comprising:
   a first means for supplying a variable DC voltage signal;
   an auxiliary switching circuit for switching the variable DC voltage to produce an AC pulse signal to be applied to an interelectrode gap between a workpiece to be machined and an electrode;
   a second means for producing a voltage higher than the DC voltage signal produced by said first means;
   a main switching circuit for switching an output of said second means to generate a main AC pulse signal to be applied to said interelectrode gap, said main switching circuit having a capacity for supplying a peak current larger than said auxiliary switching circuit; and
   a detector for detecting whether a discharge occurs at said interelectrode gap when a predetermined time has elapsed after said AC pulse signal produced through said auxiliary switching circuit is applied to said interelectrode gap, said main switching circuit being controlled based on an output of said detector and a control output from said auxiliary switching circuit.

2. The power supply unit as claimed in claim 1 wherein the control output from said auxiliary switching circuit represents a direction of the occurrence of discharge at the interelectrode gap.

3. The power supply unit as claimed in claim 1 wherein said first means supplies the variable DC voltage signal through a current limiting resistor to the interelectrode gap.

4. The power supply unit as claimed in claim 1 wherein said detector detects the occurrence of the discharge in both polarities of the AC signal.

5. The power supply unit as claimed in claim 1 wherein said detector is controlled so that the detection of the occurrence of the discharge is inhibited during a period in which the polarity of the AC signal is inverted.

* * * * *